United States Patent [19]

Prieto

[11] 3,802,214

[45] Apr. 9, 1974

[54] REFRIGERATING FISHING VESSELS

[76] Inventor: Gonzalo Alonso-Lambert Prieto, Jovellanos 9, Las Palmas De Gran Canarai, Spain

[22] Filed: July 12, 1971

[21] Appl. No.: 161,576

[30] Foreign Application Priority Data

Jan. 21, 1971 Spain .................................. 387,531
Feb. 10, 1971 Spain .................................. 388,146

[52] U.S. Cl. ........................ 62/240, 62/64, 43/8, 114/.5
[51] Int. Cl. ............................................. B63b 25/26
[58] Field of Search .......... 62/240, 64; 114/.5; 43/8

[56] References Cited
UNITED STATES PATENTS

| | | | |
|---|---|---|---|
| 1,138,541 | 5/1915 | Conekin | 62/240 X |
| 2,377,693 | 6/1945 | Johnston | 114/.5 |
| 2,413,918 | 1/1947 | Harris | 114/.5 |
| 2,513,004 | 6/1950 | Cooley | 62/240 |
| 2,766,598 | 10/1956 | Amiot | 62/240 |
| 2,836,037 | 5/1958 | Carpenter | 62/240 |
| 2,931,192 | 4/1960 | Weinberg | 62/240 |
| 3,049,890 | 8/1962 | Ruppel | 62/240 |
| 3,261,176 | 7/1966 | Puretic | 62/240 |
| 3,261,316 | 7/1966 | Puretic | 114/.5 A |

*Primary Examiner*—William J. Wye
*Attorney, Agent, or Firm*—Wenderoth, Lind & Ponack

[57] ABSTRACT

A refrigerating fishing vessel has a pump for loading catches which can suction directly from the bottom of the net. Its refrigerating and loading installation has a channel linking two deposits with different characteristics, both located on deck. The channel has a series of ducts which can be selectively closed, with the mouths of as many loading tanks. Preferentially the tanks are in even numbers and grouped in two parallel rows to the two sides of the vessel. The tanks communicate by their bottoms with a refrigerated brine system which is regulated by valves and capable of releasing a continuous flow to any of the deck deposits and/or one or more loading tanks where it is recycled, entering by the upper part. The loading tanks have intake at their bottoms which can be closed by valves independently to introduce a continuous surplus of brine which can cause overflowing of the tanks and unloading of the fish by flotation, or introduce sea water for cleaning the tanks or for keeping live bait.

14 Claims, 15 Drawing Figures

Gonzalo ALONSO-LAMBERTI PRIETO, Inventor

REFRIGERATING FISHING VESSELS

The present invention consists of a series of special installations which convert fishing vessels and transports into vessels which practically are automatically operated.

However, in order that this description be specific, it will describe a purse seiner for the fishing of sardines, and also its application to other species of larger size such as tunas, etc.

This unit is capable of storing refrigerated fish and, above all, frozen fish.

FIG. 4 shows a tuna-type purse seiner with the installation on the prow, which is the most modern purse seiner.

Figure 1:
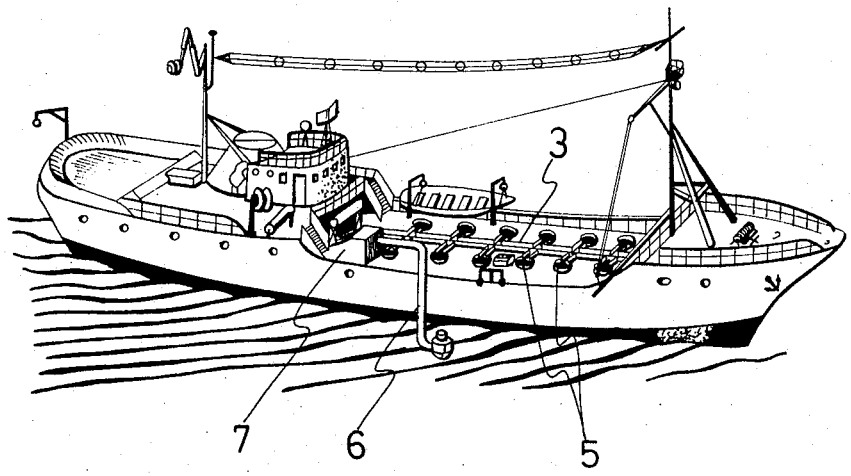
FIGS. 1, 2 and 4 show two types of modern fishing vessels. The fishing vessel shown in FIGS. 1 and 2 has the installation astern and characteristics similar to those of Norwegian or Icelandic purse seiners, most appropriate for utilizing existing fishing vessels.

Naturally these drawings are not restrictive, since the procedure is applicable to any type of current or future vessel.

The general characteristics of fishing vessels or transports shall be variable within the broadest limits.

The fish container vats, may be perfectly insulated, structural or not (as appropriate to the design of the vessel), with cylindrical, prismatic or any other shape hatchways, whichever are most useful. The number of vats, as also their volume, shall be conditioned to the needs of each project and future use to which the vessel will be put.

Fishing gear, as is logical, shall be modern and include one or more haulers, a special winch, transversal propellers (as required by the size of vessel), fish pump, dipnet gear and other installations required, depending on the type of vessel. It will also be equipped with the most modern navigating and fish detecting equipment.

The description of a purse seiner engaged in fishing for sardines will be continued in order to describe the entire procedure in detail.

Once the operation is terminated, the fish pump will transport the sardines or similar species from the killing device of the net to the water-fish separator.

The fish separated from the water will fall into a killing tank. It will be transported and submerged in this tank by a apron conveyor with blades of stainless steel or some other fine material. This operation is fundamental and herein the advantages of the invention are as follows:

a. To instantly kill the sardine without hematomas or blows and with all their scales. No blood vessels will be torn, thus we achieve a magnificent color of the flesh and will avoid bloodshed (hematomas) which are breeding grounds for microorganisms detrimental to the stable quality of the fish.

b. The fish will die "perfectly straight" whereby they can be classified by size in special machines. At present the fish arrive twisted, for which reasons machines are inoperative. Therefore, it will be a great aid to the industrial cycle for sale of packaged frozen products (in bags or boxes as also for the preserving process.

c. A superficial crust or hardening due to freezing will result which will allow safe transportation of the sardines or similars without detriment to appearance or quality.

d. The scales will likewise be cemented in their cells by freezing. The sardine will then preserve its scales, perfect appearance being achieved, and there will be avoided clogging or stoppage of the circulating brine refrigeration cycle.

Therefore, the "killing tank" produces definitive results for obtaining maximum quality in these fishing vessels.

The sardine is conveyed to the killing tank in the brine and to the Main Channel which runs down the center of the deck, it being capable of feeding all the hatchways of the container vats. Generally two tanks are simultaneously filled. This Channel has lateral registers operated at will to feed the duct which joins it to the tank hatchways.

Fish transported by the brine fall into the corresponding vat. This vat will be filled with cold brine to ⅓ of its capacity approximately. It will function as a liquid cushion. With certain fishes this level will be the highest possible, the vat being almost filled with brine to prevent damage. As will be seen later, this procedure provides perfect control of the level of brine in order to operate it at will and to achieve all desirable positions. (The collector for unloading seawater-brine may serve as a communicating vessel. The level rises when the outlet valve is closed).

The vats have a perforated deflector plate or bottom which also serves as a filter for sardines and scales. The brine continues its circuit, leaving a tank by the tube communicating the brine to the general brine collector. Each of these outlets will have its appropriate control valve.

The vats may be equipped with cooling coils or not, as appropriate to the uses of the vessel, size, etc. The refrigerating equipment may have all the variations deemed pertinent by specialized technicians.

Brine in the general collector is conveyed through the scale filters which simultaneously serve as filters for restoring the brine. These filters are usually double, as is also the motor-pump equipment for activating the brine. From the motor-pump, electrical, hydraulic, etc., equipment of these pumps which will activate the operation, the brine passes to the coolers or cooler. Once cooled, the brine will pass to the killing tank and-/or the general collector for supplying cold brine to the tanks, which collector will be under the Main Channel as indicated in the attached drawings, and will be completely protected.

Once the tank is filled with sardines, its filter-spigot plug will be applied, if necessary. This filter-spigot plug will be utilized during rough sea, for when it penetrates the hatchway and being identical to it in shape, it will cause the sardines to go down and will compress them in the tank; thus we manage to reduce to a minimum the movement of the fish and increase the stowage coefficient; even in the case of frozen fish, excessive movement thereof may be dangerous.

The tank filled with fish will continue to freeze and preserve them, this unit serving for any length of time. Thus it is possible for the catches of fish to be fully and freely commercialized.

For larger size species or when there is damage to the absorption pumps, the Main Channel shall have at its other end a hopper and a killing tank of simple construction. This aspect of the loading cycle will be carried out by nets or dipnets driven by hydraulic winches or manually in the more modest units (transfer will be effected manually, since hoisting may be effected by a netting winch.)

Above deck, between the hatchway and shipside, this unit will have lines from prow to stern where the unloading bridge or collector, constituted by a pipe of large diameter located athwart ship will circulate. It will have two vertical branches which will connect at will with the two hatchways. Any two tanks may be freely selected once their hatch sealing lids have been removed. They will be hermetically sealed, activated by a mechanical or hydraulic device which will seal the corresponding joints.

This procedure has incorporated thereto a collector tube for injecting brine (from the boat and utilizing a reserve tank or brine proceeding from a land refrigerating installation, container, special trucks. trailers, etc.). Upon injection of the brine the sardines will float and invade the collector bridge, which will be connected to the receiving deposit on land — refrigerating installation or special vehicles, etc. — to one of its extremes, and where pertinent, transport ship.

This collector bridge for unloading may have its tubes vertically placed. They can be extended telescopically in order to empty the tanks by layers or strata, which dispels the danger of clogging of the openings due to excessive crowding. (There are several solutions provided in order to avoid any mechanical mishap of this type.)

These tanks have several uses; they may be utilized to keep live bait and thus devote the vessel to the fishery of tunas by tanking, with rod or else compact the shoals of tunas and other species of interest for fishing with a purse seiner.

To this end the vessel will have a collector which will supply seawater to the tanks. It will be controlled by regulating valves. This circulation has another excellent and definitive use, since it will serve the purpose of cleaning the tank, eliminating all trace of fishes, scales, etc.

These tanks may be equipped with high coils (which offer protection against penetration of heat from the deck) to dry-store or rather, dry-preserve tunas and large size fish, which species generally require long cruises and avoid thus avoid preserving them in brine and the risk of osmotic penetration may be avoided.

As an illustration two modes by way of example but not restrictive, of the refrigerating installation of the system and tanks will be described.

The first variant is on the basis that the brine refrigerating evaporators be directly installed inside the loading tanks. Their location may vary as desired by the technicians or interested parties. Their simplest location is between the floor deflecting plate and the bottom of the tank. The deflecting plate will cause homogenous circulation of the brine through the coils, the highest effectiveness of the cycle being achieved. The tank ceiling or roof between the frustum section of the high deflecting plate, which will serve as a guide for unloading, and the tank roof, may be equipped with the cooling coils to allow dry use of the tank as a refrigeration chamber for transporting certain types of tunas.

Another variation, perhaps simpler and less costly, is to apply to circulation of the brine one or more heat exchangers, whereby complications involved in constructing coils in the tanks, valves, thermostats, etc. are avoided.

The first variant which is more appropriate for large fishing vessels, has all the functional features of the other, but further, it allows dry preservation of the fishes as well.

It is therefore entirely applicable to fishing of tunas and tuna-lie species which, being effected over extended cruises, during which the fish must be kept frozen for long periods, require keeping the catches dry with a view to avoiding the risk of salting by osmosis.

For a better understanding of the invention, reference will be made to the accompanying drawings.

It is pertinent to emphasize that in none of the drawings has it been attempted to show in detail the various parts of the installation, therefore said parts, in their secondary aspects, might adopt any characteristic. The drawings shown must consequently be considered as illustrative examples susceptible of whatever modifications are suggested by practice for each specific element and circumstance.

With specific reference to each of the Figures making up the attached plans, each of these represents the following:

FIG. 1. Perspective of a fishing vessel on whose deck there is noted the relative position of the tank openings, Main Channel, ducts and unloading bridge.

Figure 2:
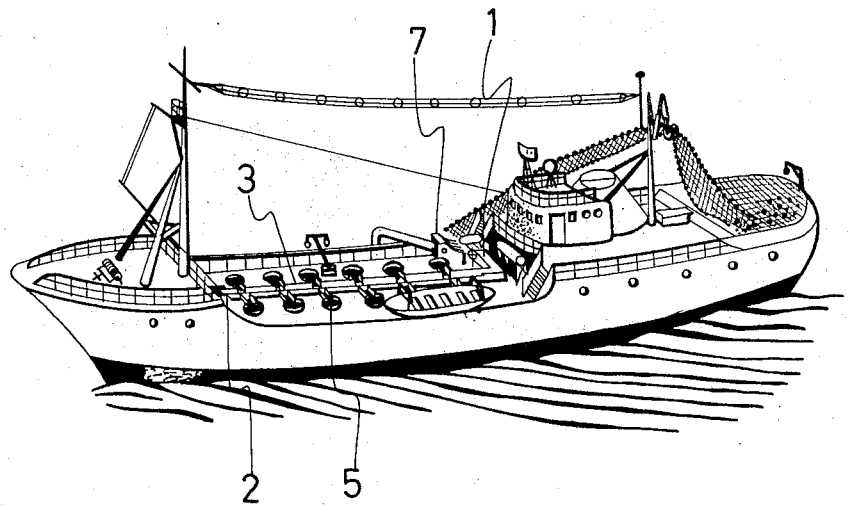

FIG. 2. Represents the same vessel showing net handling.

Figure 3:
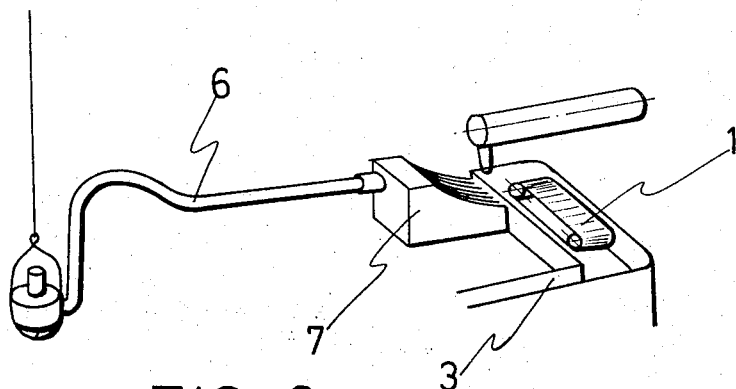
FIG. 3 shows a drawing of the main components of the installation of both vessels.

FIG. 3. Shows a perspective sketch of the main part (refrigerating installation).

Figure 4:
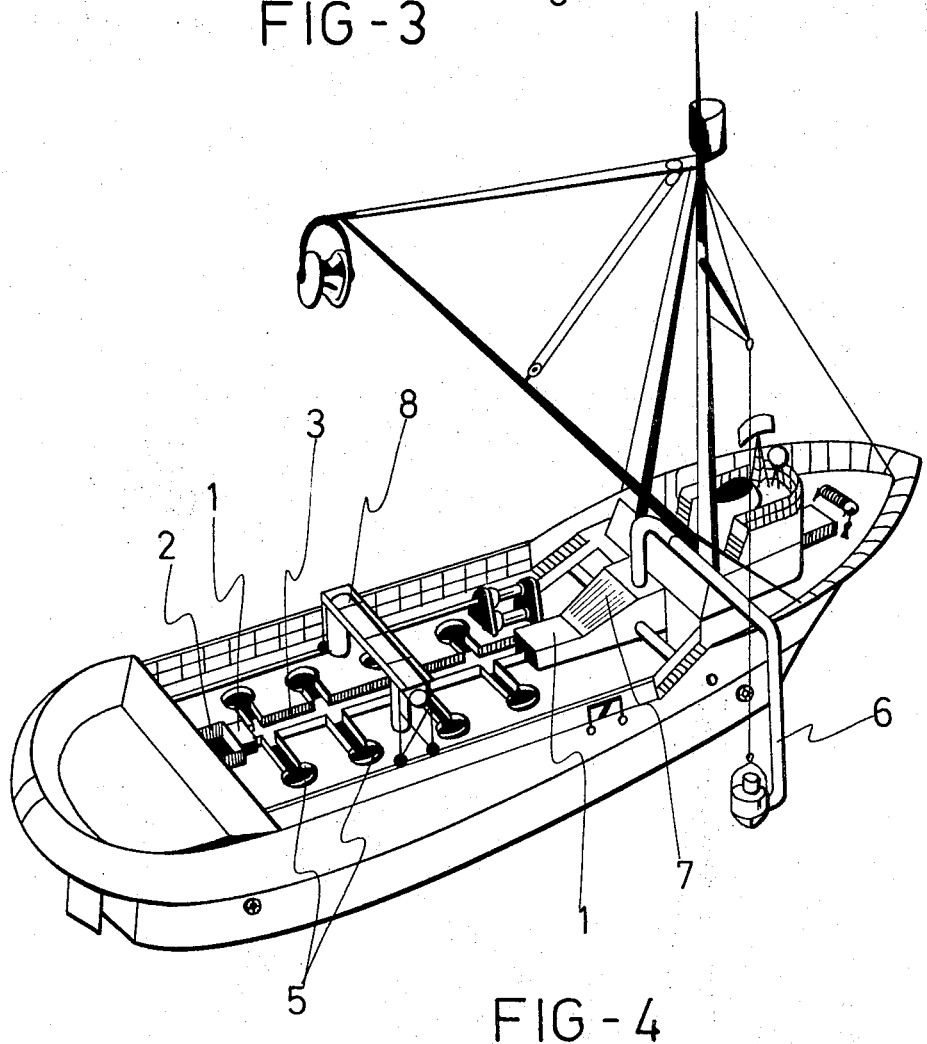

FIG. 4. Shows a perspective of a tuna-type purse seiner equipped with the same refrigerating installation.

Figure 5:
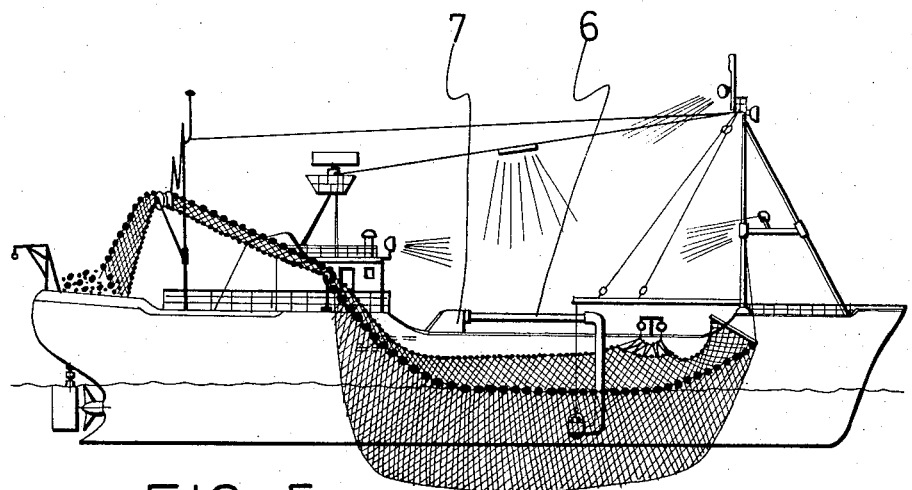
FIG. 5 shows a vessel such as that in FIG. 1, showing the manner in which the catch is loaded and the net is stowed.

FIG. 5. Shows a side elevation of the same vessel as in FIGS. 1 and 2, showing in detail fish loading and net stowage operations.

Figure 6:
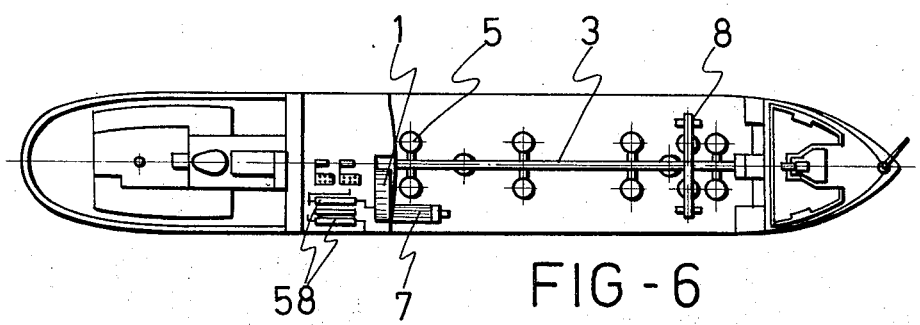
FIG. 6 shows a sketch of the refrigerating installation of the vessel in FIG. 5.

FIG. 6. Shows a sketch of the installation of the vessel in FIG. 5.

Figure 7:
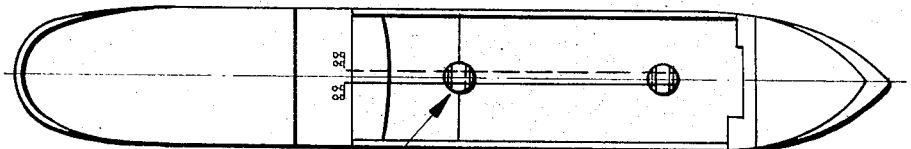
FIG. 7 shows another sketch in which the location of the valve pits according to FIG. 5 are noted.

FIG. 7. Shows another sketch in which the location of the valve pit in the installation in the preceding figure can be seen.

Figure 8:
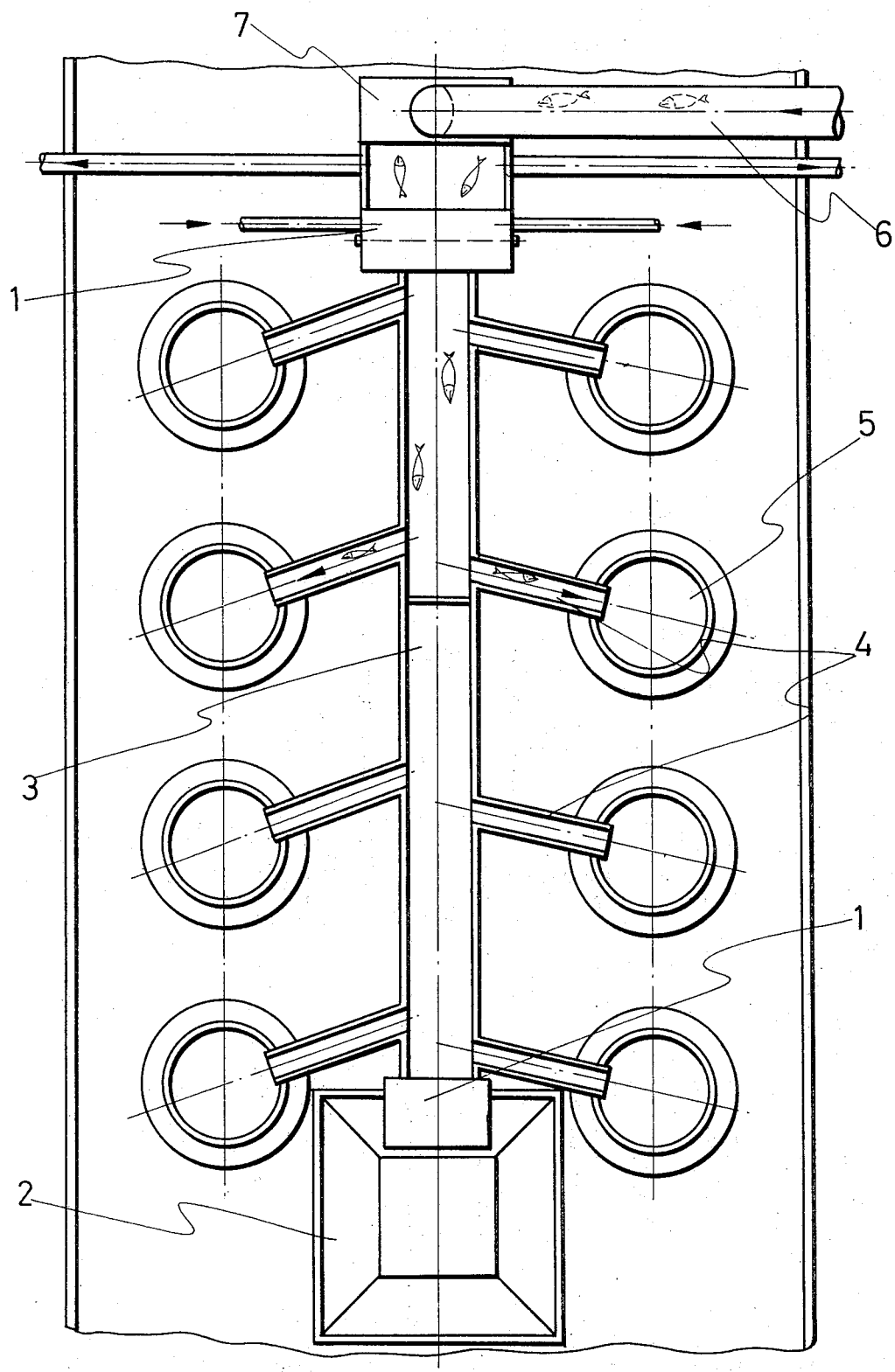

FIG. 8. Upper view of that portion of the deck occupied by the loading tanks, in which can be seen the location of the openings, Main Channel and ducts, and also of brine or fish deposits bordering on the aforementioned Main Channel.

Figure 9:
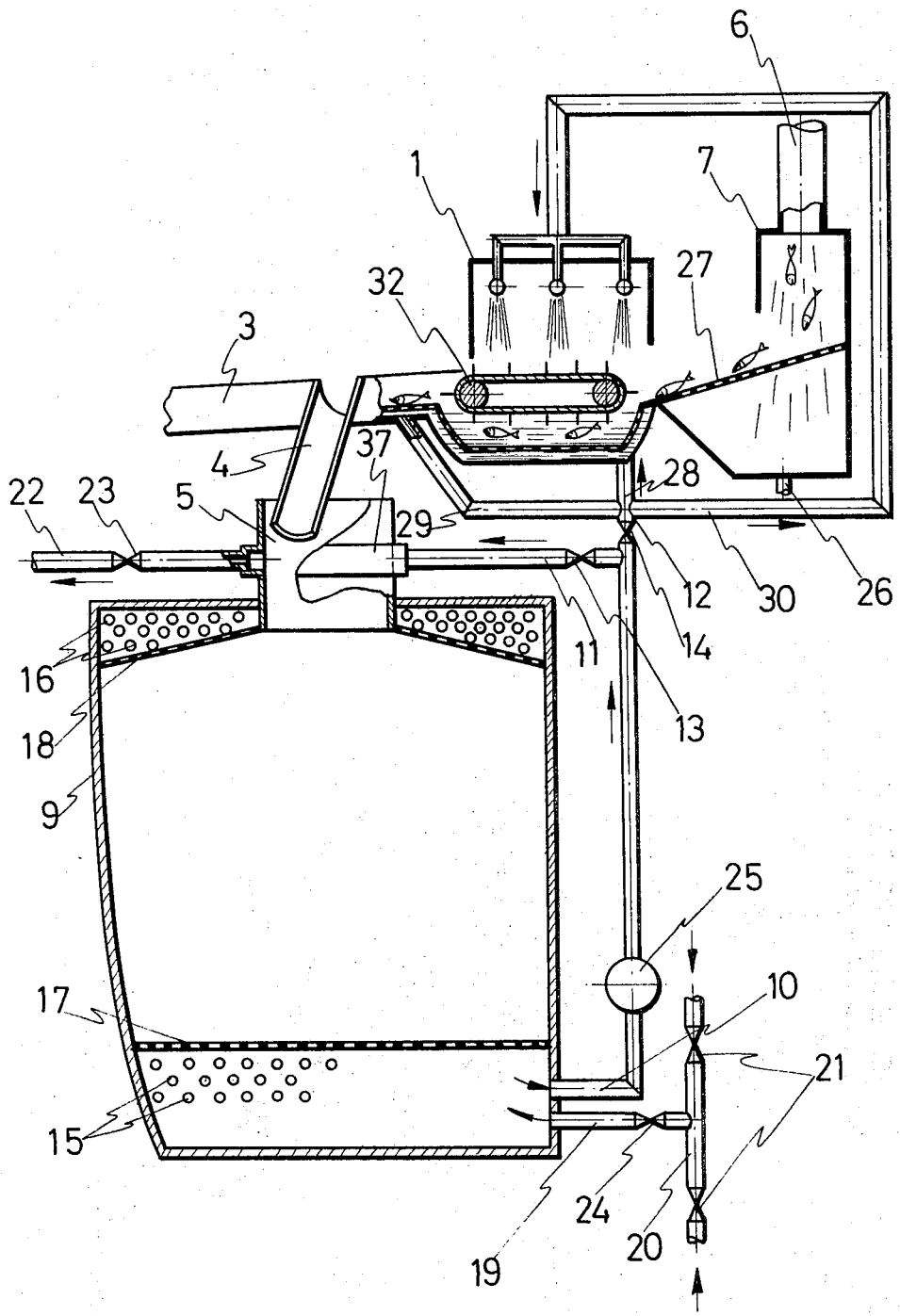

FIG. 9. Shows a diametrical section of a loading tank, according to the first variant, with the establishment of that part of the brine system directly affecting it and seen in combination with the brine deposit applicable for killing and superficially crusting the fish, which is fed by a bottom suction pump through a water-fish separator.

Figure 10:
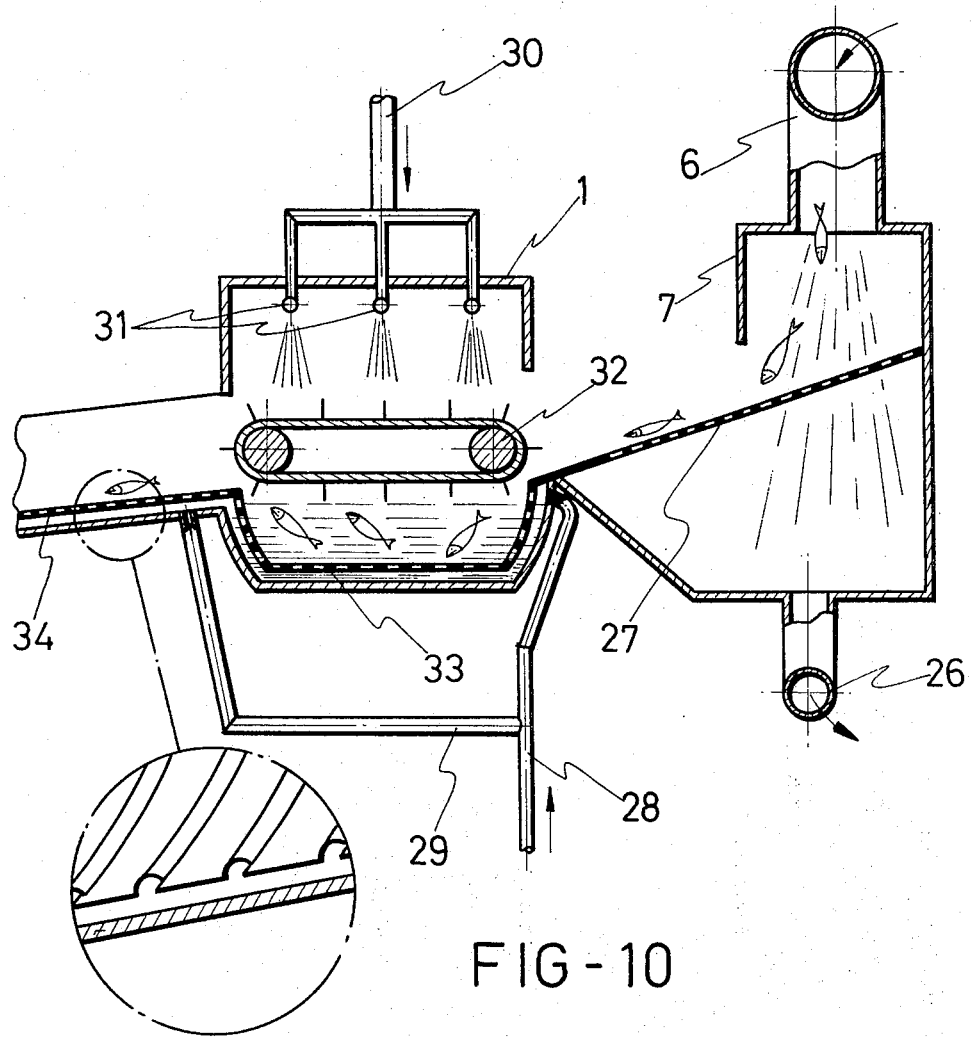

FIG. 10. Shows in detail the ensemble formed by the water-fish separator and the killing-crusting deposit fed by it, as also its apron conveyor and immersion conveyor.

Figure 11:
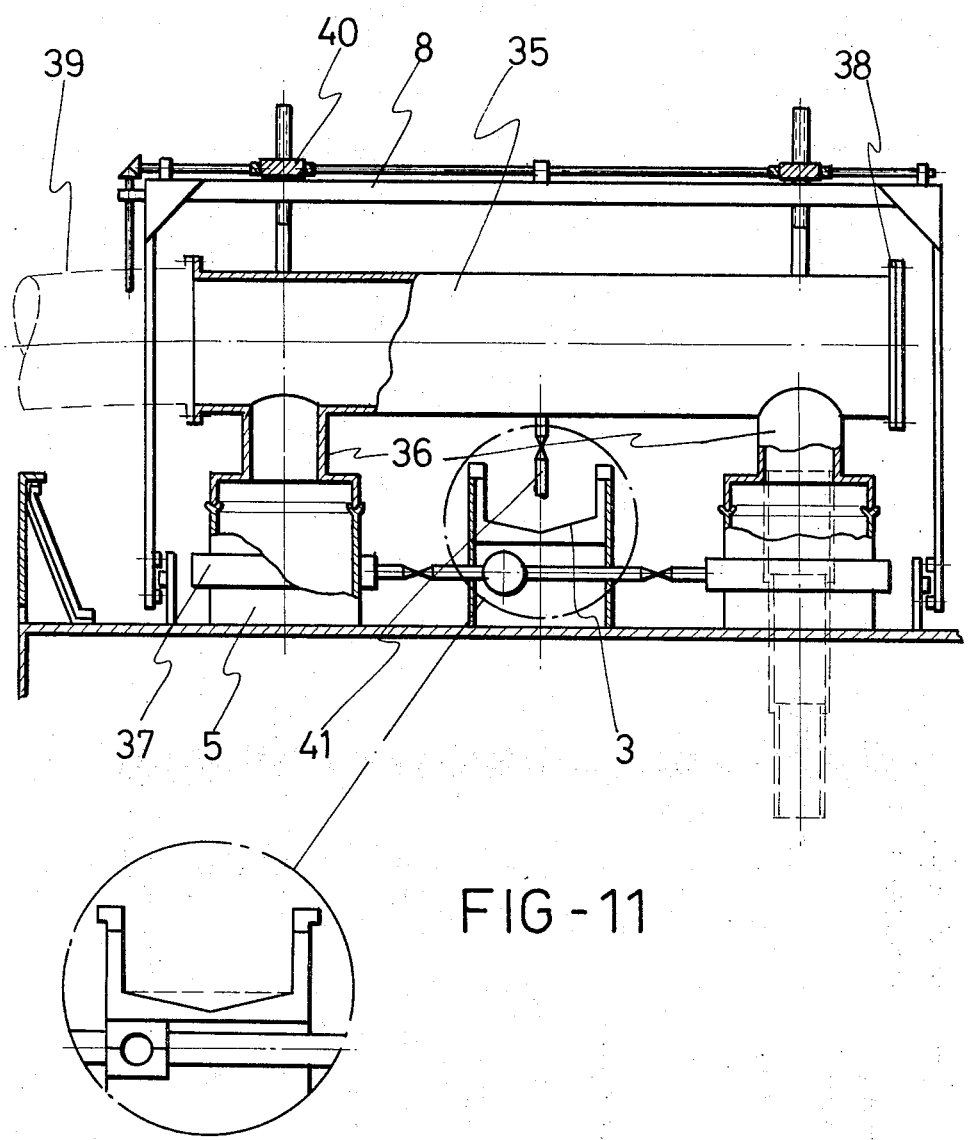

FIG. 11. Shows a front elevation view of the unloading collector bridge fitted to the mouths of a pair of loading tanks, and their telescopic device which can be utilized at will for ordering unloading by stages or strata.

Figure 12:
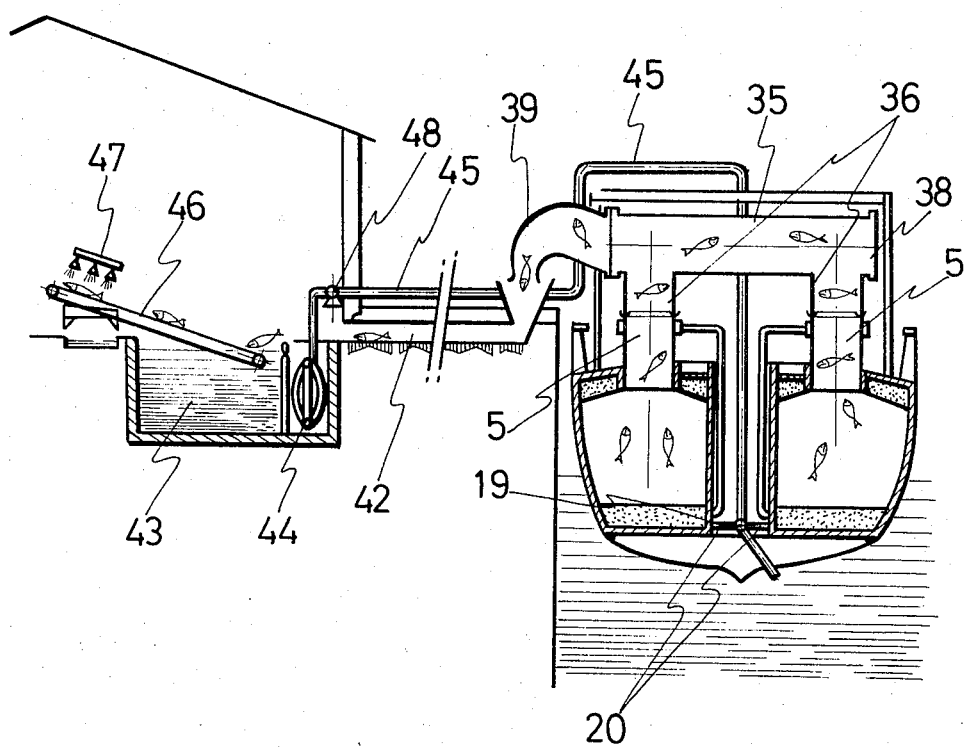

FIG. 12. Shows a detail of the manner in which unloading of the tanks is accomplished by means of the unloading bridge, to a deposit on land, transport or special vehicle, containers, etc.

Figure 13:
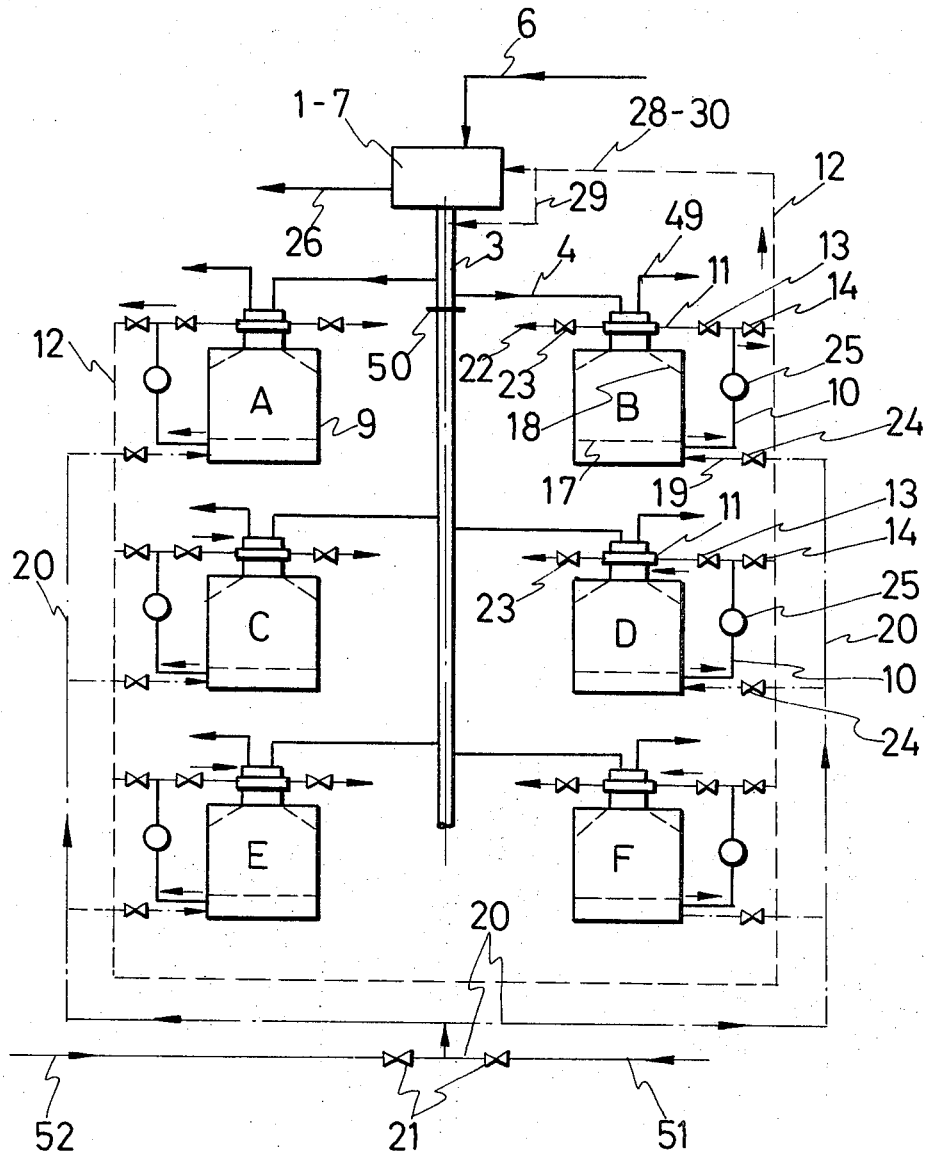

FIG. 13. Shows a sketch of an example for accomplishing the circuit ensemble for an installation in which the evaporators go to the tanks.

Figure 14:
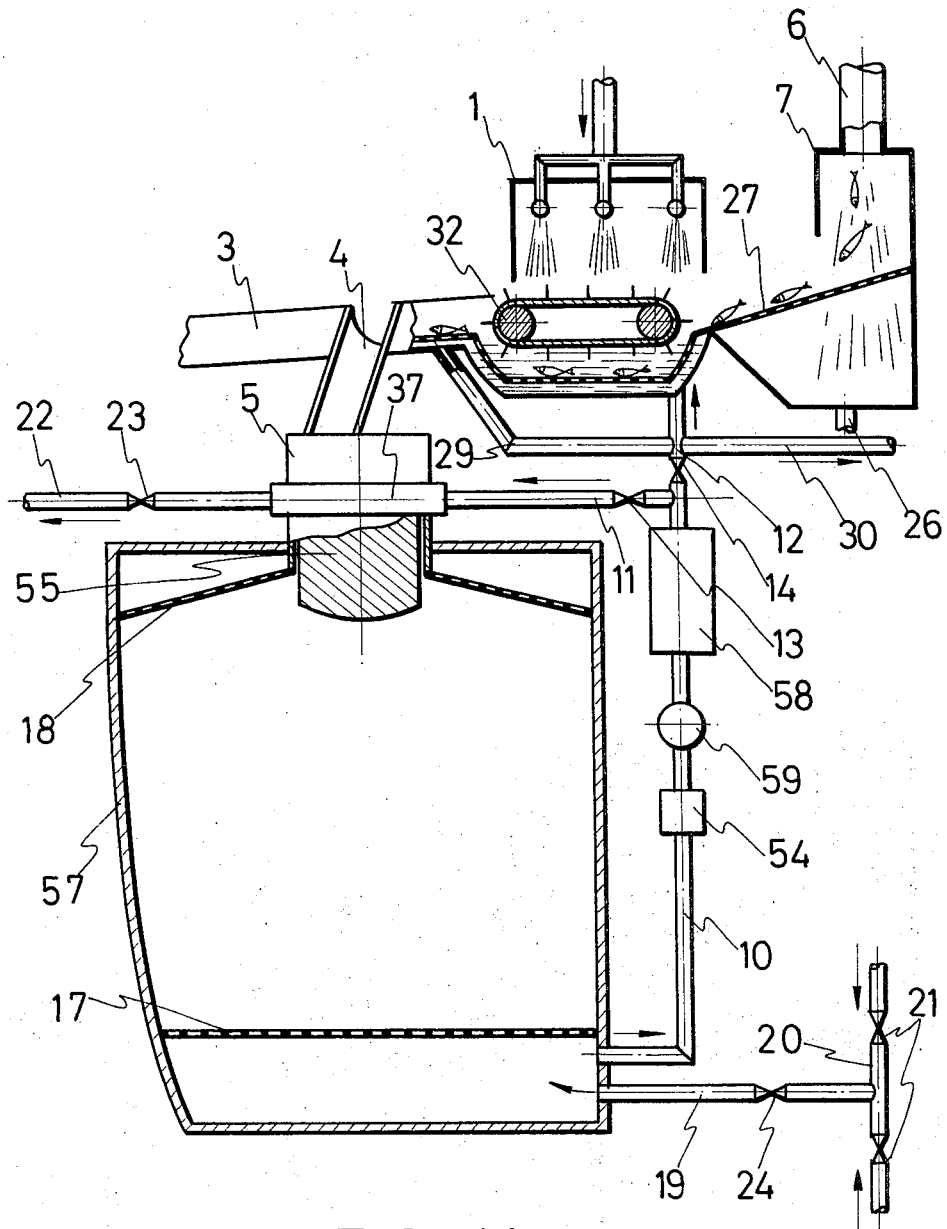

FIG. 14. Shows a diametral section of a loading tank according to the variant in which the evaporators are located on the outside of same, with the establishment of that part of the brine system directly affecting it.

Figure 15:
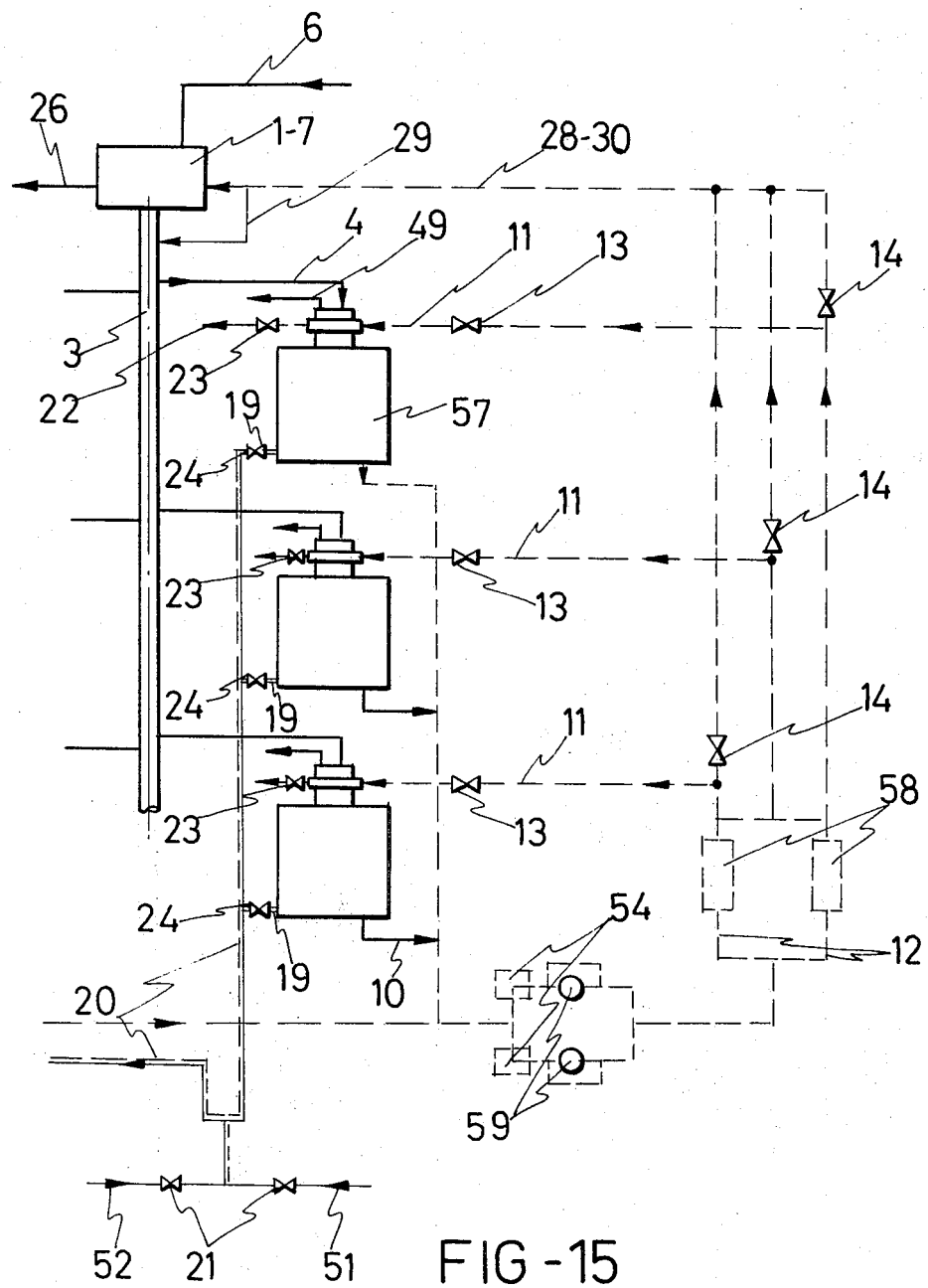

FIG. 15. Shows a sketch of an example of the circuit ensemble for an installation in which the refrigerating evaporators are located outside the loading tanks.

In accordance with the foregoing and as observed in the mentioned drawings, the proposed fishing vessel is noteworthy in that it involves a refrigerating installation which incorporates as its fundamental components, a Main Channel 3 linking two deposits with different characteristics 1 and 2, FIG. 8, located on deck, connected through a series of secondary ducts 4 to the mouths 5 of as many loading tanks, preferably in even numbers and grouped in two parallel rows to the two sides of the vessel, which tanks communicate with a refrigerated brine system which, duly regulated, is capable of transmitting a continuous flow to any of the aforesaid deposits so that from there and through the Main Channel 3 and the consequent secondary ducts (4) it returns to the loading tanks.

The fish may be hoisted aboard by net, dipnet, etc., in which case it is unloaded into a brine funnel or hopper 2 which is open and built like a tub, the fish being passed by hand or carried by the brine, size allowing, to fall into the tanks.

Preferentially, however, and as long as the dimensions of the species caught permits (the vessel is exceptionally appropriate for sardine fishery), the fish shall be hoisted aboard with the help of a conventional pump capable of suctioning from the bottom, and which leads by appropriately sized conduits 6 to a water-fish separator 7 which feeds the other cold brine deposit killing tank 1.

In this killing tank 1 which will serve to help describe the operation of the system, when the loading tanks 9 have evaporators (see FIG. 9) in their interior, the fish is mechanically forced to submerge in the refrigerated brine; they die instantly and the scales are cemented in their cells by freezing. It is then carried by the flow of brine toward the Main Channel 3 from where it passes to the tanks 9 being loaded, through the secondary ducts 4.

While the tank 9 involved is loading, the cooled brine therein is released from underneath through a tube 10 which a pump 25 suctions from, whose intake branches out into two conduits 11 and 12 controlled by valves 13 and 14 which, respectively, flow into the upper part of the tank proper 9 and into the killing tank 1 for killing and crusting the fish and cementing the scales in their cells.

During the loading operation the valve 13 located in the conduit 11 for return to the tank is closed and the brine is forced to pass through the valve 14 which is open and through the pipe 12 to the killing tank 1.

The tank 9 may have evaporators only at its bottom, at its bottom and top, and even on its sides. It has been considered in the corresponding drawings that it has evaporators 15 at its bottom, at which point they are indispensable while the loading operation proceeds since they are the only ones which can possibly be in total contact with the brine when the tank is not full, and at the top 16 where they are extremely useful to insulate the load from the heat from deck and allow transportation and dry conservation. In one case or the other, they are located behind a perforated plate or deflecting plates 17 and 18, totally enclosing them, thus preventing the fish from coming into direct contact therewith. The perforated upper plate is frustum shaped to facilitate release of the fish during unloading by flotation.

Finally, the lower part of said tanks have an inlet 19 independent of the aforementioned pipe 10, which originates in a collector 20 controlled by valves 21 which serves to introduce brine which will cause the tank to overflow so as to be unloaded by floating or, if desired, to introduce sea water to be utilized for cleaning the tanks. This will be automatic cleaning, or for transporting live bait in order to fish tunas by tanking or crowding into shoals for the seiner. The sea water will be emptied by a valve 23 controlled pipe 22 which maintains the valve 13 closed.

Of course, and during the operations of loading the tanks or circulation of brine in the closed circuit for freezing and/or conservation of catches, the valves 24 and 23 which respectively regulate intake of the brine or sea water and the sea water outlet, are closed.

Likewise and specifically during circulation in closed circuit in which the valve 14 leading to the fish killing tank is closed and that of return to the tank 13 is open, the mouth of the tank 5 is closed and its hatchway sealed and insulated.

Brine covers a relatively short course, whereby it is difficult for the fish to cause clogging.

As a precaution and safety a filter of said residue is planned along the Main Channel, a device for scale sedimenting as well as two filters, one of them located at the mouth of the tank and/or ring filter 37 through which the brine is forced to pass during freezing circulation.

The other filter could be employed in the shape of a polyethylene raffia bag or sack filled with Sodium Chloride (in event this brine is utilized) located above the deflecting plate 17. This serves as a filter to restore the brine.

Independently and at option, a spigot cap can also be provided which can be located in the neck of the tank before closing the same. This is constructed like a filter with the aid of which, aside from providing a new means for controlling impurities in the brine, the cargo can be packed during navigation to prevent movement detrimental to the scales and puncturing of the sardines.

The device 7 for separating water and fish provided in the tank feeder 1 utilized when the bottom is suctioned by a pump, is constituted simply by a receptacle which receives the flow 6 proceeding from said pump, in the middle of which and inclined as a ramp toward the entrance to the killing tank, there is a grating 27 which filters the water toward a double bottom where there is an outlet 26 for water to the sea. This grating causes the fish to slide toward the mentioned killing tank.

The killing tank 1 is closed at the top and receives the fish from the water-fish separator and has an outlet to the Main Channel, inside of which a mechanical device 32 moves. It is somewhat like a wheel with blades or an apron conveyor which forces the fish to submerge entirely in the cold brine which is continually renewed, thus activating the processes of crusting, scale cementing and death of the fish.

Feeding the brine specifically (see FIG. 9) is effected through the conduit 12 governed as will be recalled, by the valve 14, but it is unique in that said conduit forks at the branch 28 which feeds the killing tank.

Finally, the killing tank 1 as well as the Main Channel 3 have gratings 33 and 34 in their lower sections so constructed as not to damage the fish, by means of which double bottoms are achieved, susceptible of becoming collectors for undesirable particles falling off the fish (especially scales which despite crusting and cementing might peel off and collect at the end of the channel for extraction and elimination).

The unloading bridge which is indispensable for effecting unloading by flotation, as has been noted, is constituted by a frame (8, FIG. 11) sufficiently strong, equipped with mobility over the deck which can be selectively immobilized over each pair of tanks, has a collector tube 35 oriented transversally in relation to the ship from which two tubes 36 part. These are fitted and pressure sealed over the mouths 5 of the two tanks involved, mechanical, pneumatic, hydraulic, etc. 40 means being employed as provided in the unloading bridge.

The tube 35 mentioned may be closed selectively by one of its ends by means of a cover 38 so that a connector 39 can be fitted to the other end for unloading at the dock. It is also planned to incorporate a purge 41 capable of unloading in the Main Channel through which residue of the brine is eliminated which might otherwise remain inside, at completion of unloading.

In order to have a better understanding of the manner in which unloading is effected, as also of the unquestionable advantages of this system insofar as autonomy, economy in time and labor, reference is made below to FIG. 12 which schematically represents the same.

The ship, as it appears in the drawing, is moored to the unloading dock with the two tubes 36 of the collector 35 through which this is to be effected, fitted by pressure and with adequate joints over the mouths 5 of two tanks. The aforementioned collector 35, as explained in preceding paragraphs, will have the extreme farthest from the dock closed by a sealed lid 38 and at the other will have fitted to it a connector 39 which will unload, for example, in a fixed flow 42 preferentially underground and insulated, in turn emptying into a tank 43 set up on land and filled or partially filled with cooled brine by means of its own refrigerator 44.

At the same time as the land tank 43, a suction pump 48 operates which by means of a flexible pipe 45 carries the brine contained therein to the collector 20 provided for in the vessel where flow originates 19, to empty into the unloading tanks (see FIG. 9).

It is obvious that with this functional organization the surplus brine which is continually being introduced into the tanks from underneath, forces it to increase the level in said tanks until they overflow and the brine is released by the mouths, utilizing the unloading bridge and conduits as a means for taking the fish floating inside to the tank 43.

Once in the tank 43 the fish may be removed by special conveyor belt 46 which forces it under cold fresh water showers 47 capable of continually glazing it and even batching rust-proofing and other products of interest which can guarantee long range conservation of the product when it is later canned and stored in refrigeration units or in bulk in units designed to this end.

This method for effecting unloading while good and offering a number of obvious advantages in relation to traditional systems, is not the only one which can be adopted, nor does it imply limitations whereby the ship would have to depend in any case on a land receiving installation.

It is obvious that by following a procedure basically the same as those explained above, the vessel could unload to a simple brine-fish separator from which the latter could go on to be preserved, while the brine would be returned to the ship.

It could also be unloaded directly onto trucks, trailers or perforated bottom containers from which the brine would be returned aboard by a continuous process during the entire unloading operation. In any of the methods the fishing vessel would be ready and have all its brine aboard upon termination of unloading.

The fundamental characteristics of the proposed systems is evident from what has been detailed so far, and even the manner in which loading, unloading and conservation-freezing of the fish can be effected with reference to one only tank.

However, bearing in mind that all tanks have to be combined with each other so that their functions can become completely independent, reference to FIG. 13 will illustrate how each of these functions in one complete installation.

Assume that a vessel has six tanks for loading and that the communicating conduits installation has been effected as shown in the mentioned FIG. 13.

Assume also that the bottom four tanks in FIG. 13 are already completely loaded and are preserving the fish while the top two tanks are being loaded. It is obvious that both groups have to be independent of each other, each of them being circulated in a specific manner.

Under numbers 1–7 the ensemble formed by the water-fish separator and the deposit for killing the fish by immersion in brine has been shown. (See FIGS. 9 and 10).

Main Channel 3 has been provided with a sluice-gate 50 which can prevent the flow of brine to the secondary ducts of the tanks which are already preserving fish.

The two tanks which are loaded jointly according to a preferred method of operation are uncovered, have no spivot-plug, but once filled they can incorporate the same in order to prevent stowage movement and to continually receive their load of brine and fish through the secondary ducts 4 flowing into the same.

Of course, valves 23 controlling release into the sea by 22 are closed, as are valves 24 through which there are controlled the intake of sea water for cleaning or transporting live bait and intake of brine for unloading.

Brine entering the tanks carrying the fish being loaded is forced to pass by the deflecting plate 17 covering the lower evaporator, by the pump or group of pumps 25 which extract it by the conduit 10. The fish, for which the mentioned plate is an obstacle, remain in the tank subjected not only to the cold brine but, more directly, to the cold from the lower evaporator 15 which is the only one operating during loading.

Unloading of the pump 25 is effected on a fork, the flows from which are: through 11 to the tank itself, and the other 12 toward the deposit which kills the fish coming from the bottom. During the loading operation the valve 13 controlling the conduit for return to the tank is closed, while the valve 14 governing passage to the collector 12 is open.

It is therefore obvious that circulation in these tanks which follows the course indicated in the drawing by arrows located next to the corresponding flows, is effected from the killing tank to tanks 9 and from these to the killing tank again (this latter through the collector 12 and the forks 28–30 and 29 of said collector), all absolutely independent of what transpires in the other tanks.

In the already filled tanks the situation will be exactly opposite.

Their mouths will be covered, optionally provided with an internal dowel cap, and they will have lost any relation to the Main Channel 3 and corresponding secondary ducts.

Valves 23 and 24 corresponding to their intake of brine for unloading and release of water to the sea shall continue closed and the valves 13 and 14 regulating passages for return to the tank and release to the killing tank, will be operated contrary to that in the top tanks. That is to say, 14 will be closed and 13 will be open.

Consequently, it is clear that brine suctioned from the bottom of the tanks through conduits 10 is again sent by the pumps 25 to the upper parts of said tanks which are provided with circuits completely independent of the rest of the system.

During this circulation, further, since the direction followed by the brine inside each tank is contrary to the tendency of the fish to float, said fish are submitted to continuous movement which prevents them from sticking to each other.

In order to effect unloading of the tanks, which will also be done preferentially in pairs, the operation of the corresponding pumps 25 is interrupted; the valves 23 and 13 of each unit are closed, and after opening the mouth, the spivot-plug is removed and the unloading bridge (number 49) indicates release by overflow) is fitted, the valves 24 are opened, brine is inserted which comes from the storage tank or a land installation 51 by means of the collector 20.

The same collector 20 which enables this unloading in accordance with the system previously explained in detail, serves, it being regulated by a pair of valves 21 to introduce the sea water for cleaning the tanks or transporting live bait in them, taking it by its other end 52.

The release of this water for its renewal is effected by conduit 22 through valve 23 and, of course, its impulsion as well as that of the brine utilized for unloading, is effected by pumps which are independent of those originating the circulation of loading and freezing in the tanks.

Should the vessel have an installation according to the second version; e.g., if it had been planned that the evaporators for cooling the brine are located outside the tanks, all the characteristics stated would stand, although certain circumstantial variations would be made in the tanks and certain parts of the system.

In order to clarify this extreme, FIGS. 14 and 15 respectively, show a diametral section of a tank according to the variant under discussion, and a sketch of the manner in which these tanks are integrated in the system.

As can be seen in FIG. 14, the only modification to the condition that there are no interior evaporators, gaining capacity and simplifying the installation, is that the upper part 56 of said tanks 57 is identical to that described in the tanks 9 and their upper deflecting plate 18 (FIG. 9 and 14) which may conceal the upper evaporator, depending on whether it is of interest to preserve the catches in dry ice.

The remaining singularities, including the lower deflecting plate 17 which functions as a filter and prevents stoppage of the conduits for release of brine, are retained in their totality, although closer to the floor, since the evaporator coils are dispensed with.

As was the case previously, fish entering through the tank mouth from the corresponding secondary duct, necks of the tank being equipped with an interior spivot-plug 55 and distribution of pipes having access to said tanks is maintained or can be maintained as is seen in comparing FIG. 14 to 9. Common elements which have undergone no change have been referenced in both figures with the same numbers.

Note, however, that while the fundamental variation lies in nothing but the different location of the evaporators, there is a simpler system, which costs less, indicating the establishment of a greater number of filters for retaining impurities, although easily accessible and easy to clean, parts would be selected to avoid any complication.

To this end there is planned the existence of new filters 54 located in the pipes for feeding brine to the tanks before the pumps and coolers. It is provided that, apart from the deflecting plate 17 of each of these, there be at some point in the common system for an independent filter or filters 54 which will also restore the brine.

The outline in FIG. 15 showing one half of a six-tank installation built according to the variation under discussion shows a system with all the elements necessary to its functioning. Therein, conduits or valves corresponding to those of the other version, reflected in FIG. 13, have been referenced with the same numbers.

As can be noted, the variation lies in that the tanks, rather than each having a pump or group of pumps to circulate the brine by evaporators in the interior of same, are combined with only one double group of pumps 59 (one in operation and the other inoperative) to impel the brine toward an evaporator or group of two evaporators 58 so that they can then be channelled again toward the tanks either directly or passing first to the killing vat.

Of course, the drawing of the system in FIG. 15 (as is the case in that of FIG. 13) is susceptible of substantial modification. The same circulation for conservation will be utilized.

I claim:

1. A refrigerating system for use in fishing vessels, said system comprising:
   first and second fish deposits positioned for installation adjacent opposite ends of a fishing vessel;

means for delivering fish to said first or second deposits;

a main channel connecting said first and second deposits;

an even number plurality of loading tanks positioned for installation in two parallel rows along said vessel, each of said loading tanks having an upper mouth;

a secondary duct positioned to selectively provide communication between said main channel and each of said mouths of said loading tanks, and brine refrigeration means connected to the bottoms of each of said loading tanks and having means for removing brine from each of said loading tanks and for selectively passing said brine to one of said deposits and back to said loading tanks through said mouths thereof.

2. A system as claimed in claim 1, further comprising an intake attached to the bottom of each of said loading tanks; and means connected to said inlets to selectively introduce brine into the bottoms of said loading tanks to cause overflowing thereof and to selectively introduce sea water into said bottoms of said loading tanks for cleaning thereof.

3. A system as claimed in claim 2, further comprising a collector tube having a pair of tubes extending therefrom, said collector tube being selectively movable to align with adjacent pairs of mouths of said loading tanks; means closing one end of said collector tube; and connecter means attachable to the opposite end of said collector tube for receiving and unloading fish from said loading tanks.

4. A system as claimed in claim 1, further comprising means attached to said one deposit for separating water from fish supplied thereto by said means for delivering fish; and means positioned to receive such separated fish for killing said fish, said killing means comprising a killing tank, said killing tank selectively communicating said brine refrigeration means to receive said brine, and means positioned to force said fish down into said brine in said killing tank.

5. A system as claimed in claim 1, further comprising gratings positioned in said main channel and said deposits, thereby forming double bottoms for collecting debris carried by said brine.

6. A system as claimed in claim 1, further comprising annular filters attached to the mouths of each of said loading tanks to directly receive said brine from said brine refrigeration means.

7. A system as claimed in claim 1, wherein said brine refrigeration means includes evaporators for cooling said brine.

8. A system as claimed in claim 7, wherein said evaporators are positioned within each of said loading tanks at the top and bottom thereof.

9. A system as claimed in claim 8, further comprising perforated plates separating said evaporators from the main internal volume of each of said loading tanks.

10. A system as claimed in claim 9, wherein said perforated plates separating said upper evaporators are in the form of a funnel.

11. A system as claimed in claim 8, further comprising means for reducing the brine in said loading tanks to dry preserve the fish.

12. A system as claimed in claim 7, wherein said evaporators are positioned exteriorly of said loading tanks, and further comprising funnel-shaped deflector plates located within each of said loading tanks at the top thereof.

13. A system as claimed in claim 7, wherein said evaporators are positioned exteriorly of said loading tanks; and further comprising a filter plate positioned within said loading tanks adjacent the bottoms thereof.

14. A system as claimed in claim 1, wherein said brine refrigeration means includes filters therein.

* * * * *